US007346033B2

(12) United States Patent
Chang et al.

(10) Patent No.: US 7,346,033 B2
(45) Date of Patent: Mar. 18, 2008

(54) METHOD FOR ALLOCATING UATI IN A MOBILE COMMUNICATION SYSTEM FOR HIGH-SPEED DATA TRANSMISSION

(75) Inventors: Yong Chang, Songnam-shi (KR); Nae-Hyun Lim, Seoul (KR); Bill Semper, Richadson, TX (US)

(73) Assignee: Samsung Electronics Co., Ltd (KR)

( * ) Notice: Subject to any disclaimer, the term of this patent is extended or adjusted under 35 U.S.C. 154(b) by 997 days.

(21) Appl. No.: 10/308,756

(22) Filed: Dec. 3, 2002

(65) Prior Publication Data
US 2003/0223427 A1    Dec. 4, 2003

(30) Foreign Application Priority Data
Jun. 3, 2002    (KR) .............................. 2002-31188

(51) Int. Cl.
*H04Q 7/00*    (2006.01)
(52) U.S. Cl. .................... 370/331; 370/395.3; 370/392
(58) Field of Classification Search ................ 370/331, 370/349, 392, 401, 395.3, 464, 465, 467, 370/468, 469; 709/225, 229
See application file for complete search history.

(56) References Cited
U.S. PATENT DOCUMENTS
6,738,373 B2 *    5/2004    Turner ........................ 370/352

| | | | |
|---|---|---|---|
| 7,079,511 B2 * | 7/2006 | Abrol et al. ................. | 370/331 |
| 7,085,251 B2 * | 8/2006 | Rezaiifar ..................... | 370/331 |
| 7,103,662 B2 * | 9/2006 | Ray et al. .................... | 709/225 |
| 7,170,871 B2 * | 1/2007 | Eyuboglu et al. ........... | 370/331 |
| 2002/0193110 A1 * | 12/2002 | Julka et al. ................. | 455/432 |

\* cited by examiner

*Primary Examiner*—Wing Chan
*Assistant Examiner*—Mark A. Mais
(74) *Attorney, Agent, or Firm*—The Farrell Law Firm, PC

(57) ABSTRACT

A signaling processing method for allocating a UATI (Unicast Access Terminal Identifier) to a given AT (Access Terminal) in a mobile communication system including ANs (Access Networks) each having an BS (Access Network Controller), for communicating by radio with ATs, and at least one DLR (Data Location Register) connected to BSs, for storing a plurality of UATIs, which can be allocated to the ATs, and managing the remaining UATIs that are not allocated. Upon receipt of a UATI Request message from the AT, the BS transmits a UATI Allocate Request message to the DLR. Upon receipt of the UATI Allocate Request message, the DLR allocates one of the remaining UATIs to the AT and transmits a UATI Allocate Response message including the allocated UATI to the BS. Upon receipt of the UATI Allocate Response message, the BS transmits a UATI Allocate message including the allocated UATI to the AT.

13 Claims, 6 Drawing Sheets

METHOD FOR ALLOCATING UATI IN A MOBILE COMMUNICATION SYSTEM FOR HIGH-SPEED DATA TRANSMISSION

PRIORITY

This application claims priority to an application entitled "Method for Allocating UATI in a Mobile Communication System for High-Speed Packet Data Transmission" filed in the Korean Industrial Property Office on Jun. 3, 2002 and assigned Serial No. 2002-31188, the contents of which are hereby incorporated by reference.

BACKGROUND OF THE INVENTION

1. Field of the Invention

The present invention relates generally to a method for allocating an identifier to an access terminal in a mobile communication system, and in particular, to a method for allocating a UATI (Unicast Access Terminal Identifier) to an access terminal in a mobile communication system.

2. Description of the Related Art

In general, a CDMA2000 1× (IS-95C) system can transmit data at 144 Kbps, two or more times faster than an IS-95B system having a maximum data rate of 64 Kbps. Further, the CDMA2000 1× system supports services provided through a radio multimedia platform such as Java, Brew, etc., a multimedia service such as a streaming type of AOD/VOD (Audio On Demand/Video On Demand) etc., and a text service.

A CDMA2000 1×EV-DO (Evolution-Data Only) system, which has evolved from the CDMA2000 1× system having a maximum data rate of 144 Kbps, has a maximum data rate of 2.4 Mbps, at least 16 times faster than the CDMA2000 1× system, and can support bidirectional data transmission as well as high-speed Internet search. If the CDMA2000 1× EV-DO technology acknowledged by the ITU (International Telecommunication Union) is used, a large amount of traffics can be transmitted with superior quality by optimizing existing voice and data spectrum.

However, while the CDMA2000 1×system uses an IMSI (International Mobile Subscriber Identity) permanently allocated to an access terminal (AT), the CDMA 1×EV-DO system uses a UATI temporarily allocated to the AT by an access network controller (ANC), corresponding to a base station controller (BSC), in order to provide a high-speed packet data service. Therefore, in order to provide a high-speed packet data transmission service efficiently in the CDMA 1×EV-DO system, which is a mobile communication system for high-speed packet data transmission, a specific UATI allocation method is needed for determining when the UATI is to be allocated to the AT and which UATI is to be allocated.

SUMMARY OF THE INVENTION

It is, therefore, an object of the present invention to provide a method for allocating a UATI to an AT in a mobile communication system for high-speed packet data transmission.

It is another object of the present invention to provide a method for exchanging messages between an AT, an ANC, and a data location register (DLR) in order to allocate a UATI to the AT in a mobile communication system for high-speed packet data transmission.

According to an aspect of the present invention, there is provided a signaling processing method for allocating a UATI to a given AT (Access Terminal) in a mobile communication system including access networks, each having an ANC (Access Network Controller), for communicating by radio with ATs, and at least one DLR (Data Location Register) connected to ANCs, for storing a plurality of UATIs, which can be allocated to the ATs and managing the remaining UATIs that are not allocated. In the method, upon receipt of a UATI Request message from the AT, the ANC transmits a UATI Allocate Request message to the DLR. Upon receipt of the UATI Allocate Request message, the DLR allocates one of the remaining UATIs to the AT and transmits a UATI Allocate Response message including the allocated UATI to the ANC. Upon receipt of the UATI Allocate Response message, the ANC transmits a UATI Allocate message including the allocated UATI to the AT.

According to another aspect of the present invention, there is provided a signaling processing method for reallocating a UATI to an AT (Access Terminal) while the AT to which the UATI is allocated by a first DLR (Data Location Register) moves to an AN (Access Network) where a second DLR allocates the UATI in a mobile communication system including a plurality of ANs each having an ANC (Access Network Controller), for communicating by radio with a plurality of ATs, and two or more DLRs each connected to the ANC included in at least one AN, for storing a plurality of UATIs and managing remaining UATIs that are not allocated. In the method, upon receipt of a UATI Request message including an old UATI from the AT, the ANC transmits to the second DLR a UATI Allocate Request message for requesting the second DLR to reallocate the UATI. Upon receipt of the UATI Allocate Request message, the second DLR transmits to the first DLR a Session Information Request message for requesting the first DLR to transmit session information relating to the old UATI. Upon receipt of the Session Information Request message, the first DLR transmits a Session Information Response message including the session information relating to the old UATI to the second DLR. The second DLR reallocates one of the remaining UATIs to the AT and transmits a UATI Allocate Response message including the reallocated UATI to the ANC. Upon receipt of the UATI Allocate Response message, the ANC transmits a UATI Allocate message including the reallocated UATI to the AT.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Unlike a CDMA2000 1x system in which an IMSI is permanently allocated, a CDMA2000 1xEV-DO system temporarily uses a UATI temporarily allocated to an AT by an ANC(BS, Base Station). The present invention newly proposes UATI allocation-related messages exchanged between a DLR, which determines when the UATI is to be allocated to the AT, and which UATI is to be allocated, an ANC, and an AT in the CDMA2000 1x EV-DO system (hereinafter, referred to as a mobile communication system for high-speed packet data transmission), so that the UATI can be efficiently allocated to the AT.

Figure 1:
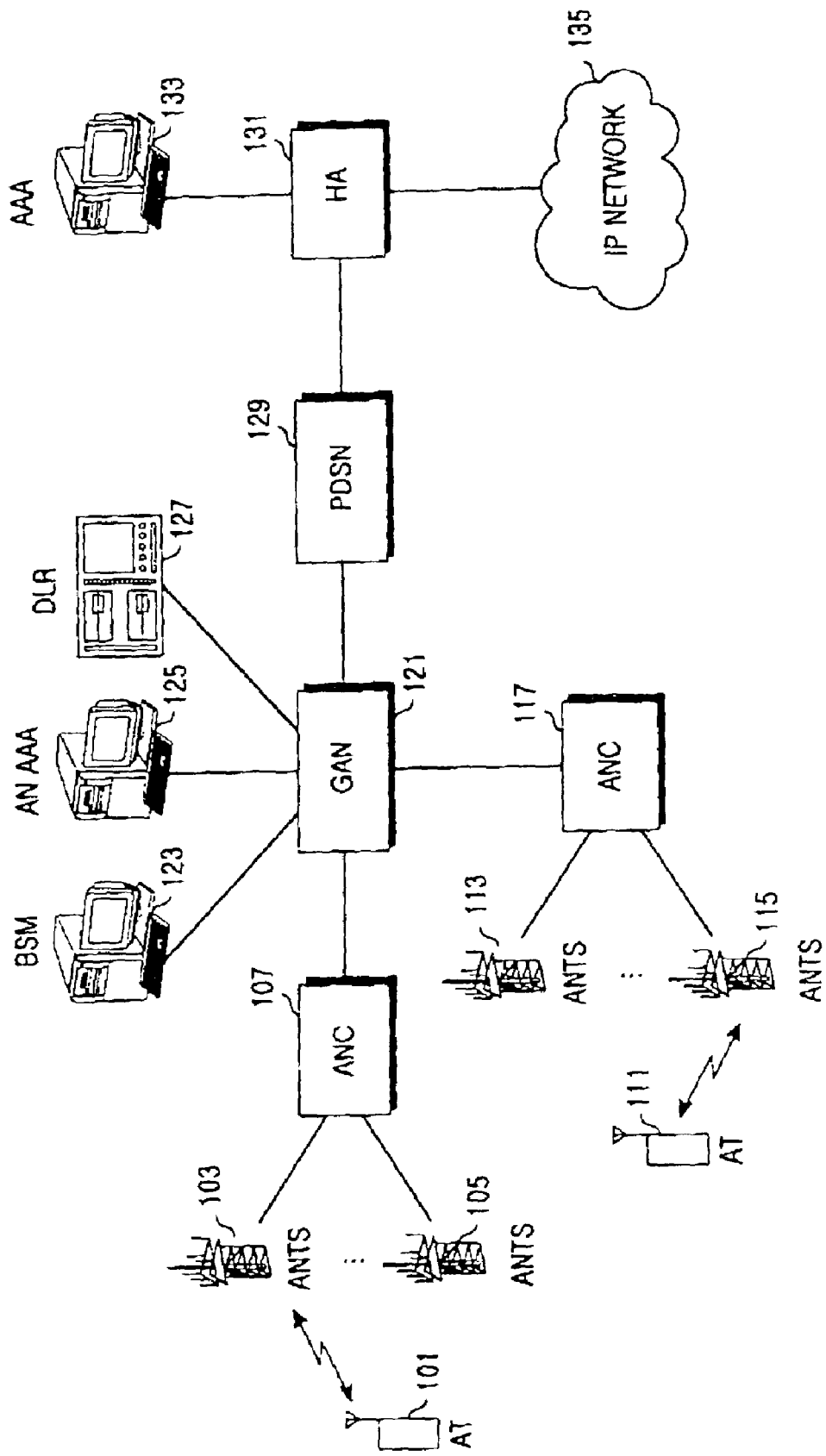
FIG. 1 illustrates an entire structure of a mobile communication system for high-speed packet data transmission.

FIG. 1 illustrates an entire structure of a mobile communication system for high-speed packet data transmission. Access network transceiver systems (ANTSs) 103, 105, 113, and 115 transmit/receive signals to/from ATs 101 and 111, respectively. ANCs 107 and 117 control the ANTSs 103, 105, 113, and 115. A general ATM (Asynchronous Transfer Mode) switch network (GAN) 121 connects the ANCs 107 and 117 with peripheral devices. A base station manager (BSM) 123 is connected to the GAN 121. An access network authentication, authorization and accounting server (AN AAA) 125 connected to the GAN 121 authenticates the ATs 101 and 111. A DLR 127 connected to the GAN 121 manages a UATI session. A packet data service node (PDSN) 129 connected to the GAN 121 is defined in the CDMA2000 1x system. A home agent (HA) 131 is connected to the PDSN 129, and an authentication, authorization and accounting server (AAA) 133 is connected to the HA 131. An Internet protocol (IP) network 135 is connected to the HA 131. The ANTSs 103 and 105 and the ANC 107 constitute one access network (AN), and the ANTSs 113 and 115 and the ANC 117 constitute another AN. The CDMA 1xEV-DO system, a mobile communication system for high-speed packet data transmission, has a plurality of subnets. The subnet is an area managed by one GAN. The number of ANs constituting one subnet may be variable according to traffic circumstances, and usually one subnet consists of 20 to 30 ANs.

In FIG. 1, although the DLR 127 covers one subnet, that is, one GAN area, the DLR may cover a plurality of GAN areas or a plurality of DLRs may be connected to one GAN area. The construction between the DLR and GAN is not directly related to the present invention, so a description thereof will not be provided.

A description will be made of types and structures of messages exchanged between the ANC and the DLR when the AT requests the ANC to allocate a UATI in a mobile communication system for high-speed packet data transmission with reference to Tables 1 to 6.

Table 1 below shows fields constituting a UATI Allocate Request message transmitted by the ANC to the DLR when the AT requests the ANC to allocate the UATI.

TABLE 1

| Field | Type |
| --- | --- |
| Message Type | M |
| Message Length | M |
| TID | M |
| OldUATI | O |
| Authentication Parameter | O |
| Paging Parameter | O |
| Location Registration | M |
| HW ID | O |

Referring to Table 1, fields for the UATI Allocate Request message are divided into mandatory fields M when carrying of corresponding information is mandatory and optional fields O when information is optionally carried. The mandatory fields M for the UATI Allocate Request message include a Message Type field indicating the type of a message, a Message Length field indicating the length of a message, a TID (Transaction IDentifier) field for identifying ATs, and a Location Registration field consisting of ANC_ID and ANTS_ID, used for registering the location of an AT. The optional fields O for the UATI Allocation Request message include an OldUATI field for transmitting, if the AT has a previously allocated UATI (OldUATI), an Authentication Parameter field consisting of a Security Layer Packet, a Sector ID, and a Time Stamp, used for authenticating the AT, a Paging Parameter field having a maximum of 20 bytes used during paging, and an HW ID (Hardware Identification) field indicating hardware information. If the UATI Allocate Request message includes the OldUATI field, the Authentication Parameter is included therein, and if the UATI Allocate Request message does not include the OldUATI field, the Paging Parameter is included therein.

Table 2 below shows fields constituting a UATI Allocate Response message transmitted by the DLR to the ANC in response to the UATI Allocate Request message.

TABLE 2

| Field | Type |
| --- | --- |
| Message Type | M |
| Message Length | M |
| TID | M |
| RET | M |
| UATI | O |
| PDSN IP Address | O |
| Access Network Address | O |

Referring to Table 2, fields for the UATI Allocate Response message are also divided into mandatory fields M when corresponding information is necessarily carried and optional fields O wherein information is optionally carried. The mandatory fields M for the UATI Allocate Response message include a Message Type field indicating the type of a message, a Message Length field indicating the length of a message, a TID field for identifying ATs, and an RET (Return) field indicating the result of a service. A TID received through the UATI Allocate Request message of Table 1 is carried in the TID field, and a return of the UATI Allocate Request message is carried in the RET field. The optional fields O for the UATI Allocation Response message include a UATI field for transmitting, if the AT has an allocated UATI, a PDSN IP Address field indicating an IP address of the PDSN, and an Access Network Address field indicating an address of the AN. Only when the UATI to be allocated exists, corresponding information is carried on the PDSN IP Address field and the Access Network Address field.

Table 3 below shows fields constituting a UATI Allocate Complete Request message (hereinafter, referred to as a UATI Complete Request message) indicating that the UATI has normally been allocated to the AT, transmitted by the ANC to the DLR.

TABLE 3

| Field | Type |
|---|---|
| Message Type | M |
| Message Length | M |
| TID | M |
| UATI | M |
| Location Registration | M |

In Table 3, a UATI value allocated to the AT is carried in the UATI field.

Table 4 below shows fields constituting a UATI Allocate Complete Response message (hereinafter, referred to as a UATI Complete Response message) transmitted by the DLR to the ANC in response to the UATI Complete Request message shown in Table 3.

TABLE 4

| Field | Type |
|---|---|
| Message Type | M |
| Message Length | M |
| TID | M |
| RET | M |
| MN ID | O |
| Paging Parameter | O |
| OldUATI | O |
| HW ID | O |

Referring to Table 4, a return of the UATI Complete Request message is carried in the RET field. In an MN (Mobile Node) ID field, information is carried only when corresponding information exists. Likewise, in an HW ID field, information is carried only when corresponding information exists.

Table 5 below indicates the RET field among the fields for the UATI Allocation Response message shown in Table 2. The RET field is included in a response message to a request message. That is, a value representing a return of the request is carried in an RET Value field.

TABLE 5

| 7 | 6 | 5 | 4 | 3 | 2 | 1 | 0 | Octet |
|---|---|---|---|---|---|---|---|---|
| Element Identifier | | | | | | | | 1 |
| Length | | | | | | | | 2 |
| RET Value | | | | | | | | 3 |

Tables 6 and 7 below indicate meanings of values used in the RET Value field shown in Table 5. In Table 6, the meanings of the RET values are classified by an upper 4 bits of the value of the RET Value field. In Table 7, the meanings of the RET values are classified in more detail.

TABLE 6

| Class | Binary Value | Meaning |
|---|---|---|
| Normal | B'0000~B'0001 | Return of message is successful. |
| Resource | B'0010 | Failure due to shortage of resource etc. |
| Processing | B'0011~B'0101 | Failure in service. |
| Message Invalid | B'0101 | Failure in message transmission due to erroneous message or error in TID. |
| Protocol Error | B'0110 | Failure due to error in parameter. |
| Authentication Failure | B'0111 | Failure in authentication. |
| Reserved | B'1000~B'1110 | Unused |
| ETC | B'1111 | Failure due to the other causes. |

TABLE 7

| Class | RET Value | Name | Meaning |
|---|---|---|---|
| Normal | H'01 | SUCCESS | Return of message is successful. |
| | H'02 | DUPLICATED_UATI | Duplicated UATI having the same MN ID exists. |
| Resource | H'21 | NO_UATI_AVAILABLE | UATI resource to be allocated is short. |
| Processing | H'31 | UNKNOWN_UATI | Received UATI is not allocated UATI. |
| | H'32 | AUTHENTICATION_FAILED | Failure in SHA-1 authentication specified in IS-856. |
| | H'33 | STAIL_OLDUATI | MN ID or session information corresponding to received OldUATI does not exist. |
| | H'34 | MN_ID-MISMATCHED | Transmitted MN ID is different from stored value. |
| | H'35 | LOC-Unavailable | Location information of AT is not clear. |
| Protocol | H'41 | INVALID_MESSAGE-TYPE | Message type is unknown. |
| | H'42 | MANDATORY-ELEMENT_OMITTED | Mandatory parameter has been omitted. |

TABLE 7-continued

| Class | RET Value | Name | Meaning |
|---|---|---|---|
| | H'43 | UNKNOWN_ELEMENT | Unknown parameter has been received. |
| | H'44 | INVALID_ELEMENT | Contents of parameter are invalid. |
| | H'4F | GENERAL-PROTOCOL_ERROR | Failure in processing of other protocol. |
| PPS | H'51 | PPS_Not-OK | PPS (Pre-Paid Service) subscribers are unlimited. |
| ETC | H'FF | GENERAL_ERROR | Failure due to the other causes. |

In Table 7, NO_UATI_AVAILABLE is used to represent that there is no available UATI when the UATI resource to be allocated is short, UNKNOWN_UATI is used to represent that the received UATI is not the allocated UATI when the OldUATI received from the ANC cannot be found, AUTHENTICATION_FAILED is used to represent failure in authentication for the received OldUATI, and STALE_OldUATI is used to represent that the MN ID or session information corresponding to the received OldUATI does not exist.

Table 8 below shows the MN ID field among fields for the UATI Complete Response message indicated in Table 4.

TABLE 8

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | Identity digit 1 | | | Odd/even | | Type of Identity | | 3 |
| | Identity digit 3 | | | | Identity digit 2 | | | 4 |
| | | | ... | | | | | ... |
| | Identity digit N+1 | | | | Identity digit N | | | N |

Table 9 below indicates meanings of values of the MN ID field shown in Table 8. The MN ID field represents a type of a used identity. Such an MN ID includes an IMSI (International Mobile Subscriber Identity) used to identify international subscribers, an ESN (Electronic Serial Number) assigned as a fixed bit during manufacturing, an MIN (Mobile Identification Number), a broadcast address used for broadcasting.

TABLE 9

| Binary Value | Meaning |
|---|---|
| 000 | No Identity Code |
| 001 | MIN |
| 010 | Broadcast Address |
| 101 | ESN |
| 110 | IMSI |

A signaling procedure between the AT, ANC, and DLR, for allocating a UATI in the mobile communication system for high-speed packet data transmission will be described in detail with reference to FIGS. 2 to 6.

Figure 2:
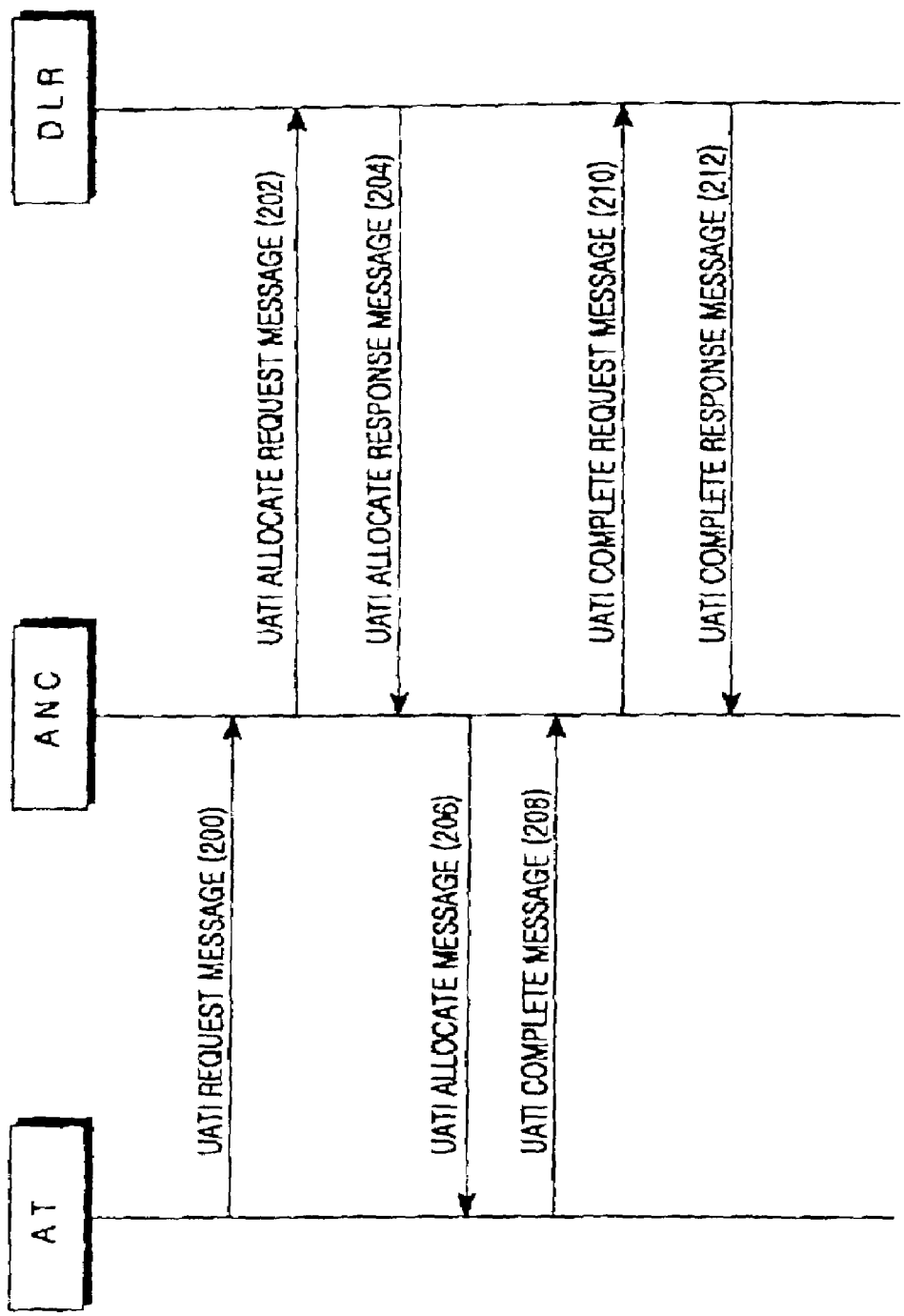
FIG. 2 illustrates a procedure for exchanging messages when the AT is initially driven to open a session for the first time in a mobile communication system for high-speed packet data transmission according to a preferred embodiment of the present invention.

FIG. 2 illustrates a procedure for exchanging messages between the AT, ANC, and DLR, for allocating the UATI when the AT is initially driven to open a session for the first time in the mobile communication system for high-speed packet data transmission.

The AT, a CDMA 1x EV-DO terminal, has no UATI therein when power is initially turned ON or a session is initially opened. In this case, the AT transmits to the ANC a UATI Request message for requesting the ANC to allocate a UATI by using a random access terminal identifier (RATI), which is generated at random therefrom, so that the ANC can select any one of a plurality of DLRs existing in a GAN area. A procedure for exchanging messages when the AT initially opens the session will now be described with reference to FIG. 2.

In FIG. 2, the AT transmits the UATI Request message to the ANC using the RATI in step 200 to request the ANC to allocate the UATI. Upon receipt of the UATI Request message, in step 202, the ANC transmits to the DLR the UATI Allocate Request message illustrated in Table 1, including the Paging Parameter, to request the DLR to allocate the UATI. As described with reference to Table 1, not the Authentication Parameter, but the Paging Parameter is included in the UATI Allocate Request message because the AT has requested the ANC to allocate the UATI by using the RATI rather than the OldUATI. Thus, when the AT transmits the UATI Request message using the RATI to the ANC, the ANC selects any DLR among DLRs within a subnet and transmits the UATI Allocate Request message to the selected DLR. Upon receipt of the UATI Allocate Request message, the DLR checks whether the AT requesting the ANC to allocate the UATI is an AT opening a new session within the subnet of the DLR area or an AT moving from an adjacent subnet. When the RATI is used, the DLR recognizes the AT requesting the ANC to allocate the UATI as an AT opening a new session. Then the DLR stores the Paging Parameter transmitted by the ANC and transmits the UATI Allocate Response message illustrated in Table 2 to the ANC in step 204. Upon receiving the UATI Allocate Response message, the ANC transmits a UATI Allocate message to the AT in step 206 to allocate a new UATI to the AT. The AT, which has received the UATI Allocate message, transmits to the ANC a UATI Allocate Complete message (hereinafter, referred to as a UATI Complete message) indicating that the new UATI has been allocated in step 208. Upon receiving the UATI Complete message, the ANC transmits the UATI Complete Request message shown in Table 3 to the DLR in step 210. Upon receipt of the UATI Complete Request message, the DLR transmits the UATI Complete Response message shown in Table 4 to the ANC in step 212 to terminate a UATI allocating procedure. In this case, since the DLR has no MN ID for the AT, it does not transmit the MN ID to the ANC.

Figure 3:
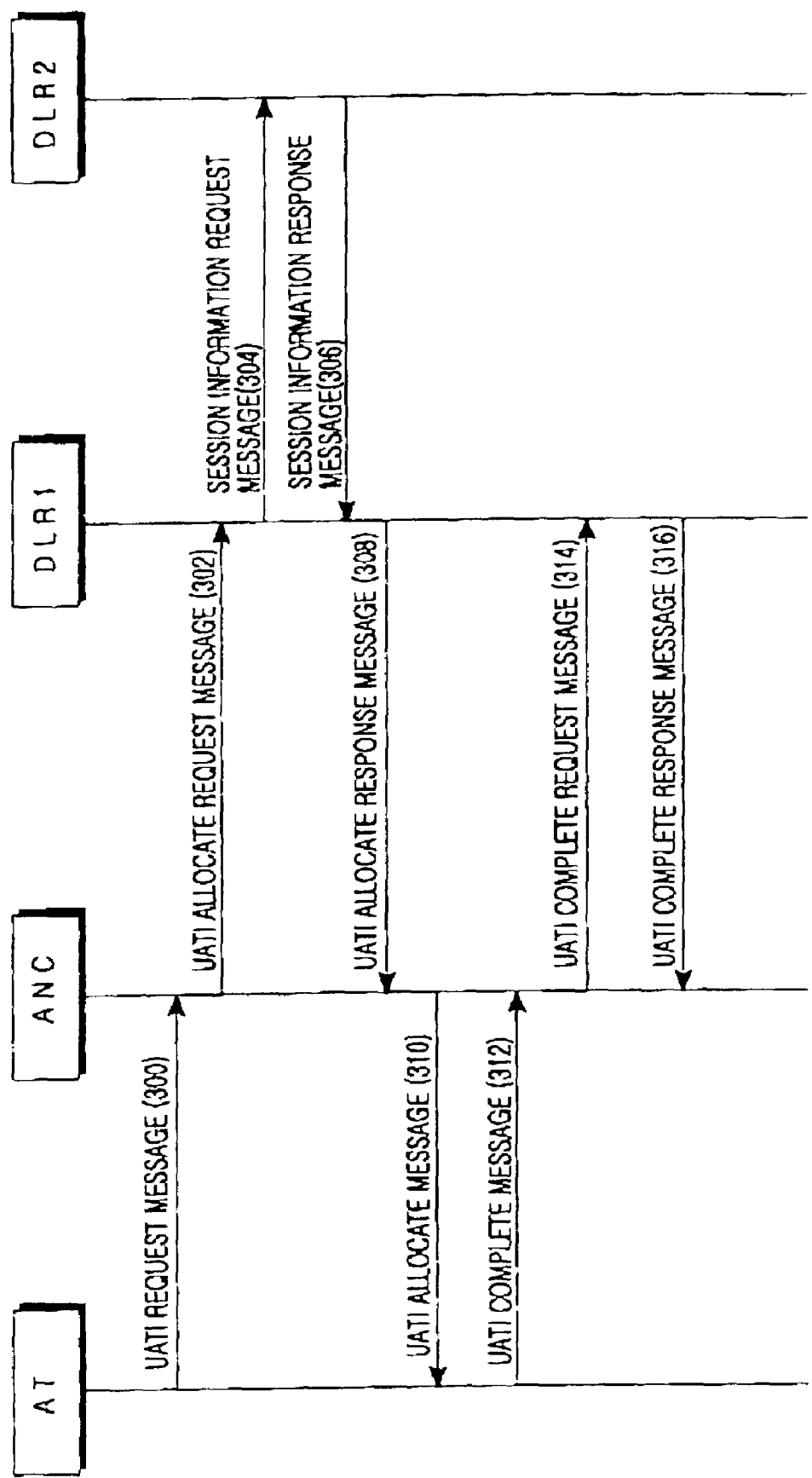
FIG. 3 illustrates a procedure for exchanging messages when the DLR includes session information while the AT hands off in a mobile communication system for high-speed packet data transmission according to a preferred embodiment of the present invention.

FIG. 3 illustrates a procedure for exchanging messages between the AT, ANC, and DLRs while the AT hands off in the mobile communication system for high-speed packet data transmission. In FIG. 3, a first DLR (DLR2) within a subnet to which the AT has belonged before handoff has session information, and the AT is to belong to a second DLR (DLR1) through the handoff. The CDMA 1x EV-DO system includes a plurality of subnets. The subnet indicates an area where information representing that the current AT opens the session for the first time and information on the UATT of the AT or the session is managed. If the AT moves from its subnet to another subnet, the AT recognizes that the subnet is changed through an overhead message and requests the ANC to allocate a new UATI. A description will now be made of a procedure for exchanging messages between the AT, ANC, DLR1, and DLR2 when the DLR2 has session information while the AT hands off the subnet in the mobile communication system for high-speed packet data transmission with reference to FIG. 3.

The AT transmits the UATI Request message to the ANC in step 300 by use of the OldUATI, which has been allocated from the DLR2 within the subnet before the handoff. Upon receipt of the UATI Request message, the ANC transmits to the DLR1 the UATI Allocate Request message illustrated in Table 1, including the OldUATI instead of the Paging Parameter in step 302, to request the DLR1 to allocate the UATI. Upon receiving the UATI Allocate Request message, the DLR1 transmits a Session Information Request message to the DLR2 having the session information of the AT in step 304 to request the DLR2 to transmit OldUATI-related information. The DLR2 then transmits a Session Information Response message including the OldUATI-related information to the DLR1 in step 306. Upon receiving the OldUATI-related information, the DLR1 transmits the UATI Allocate Response message illustrated in Table 2 to the ANC in step 308 to allocate the UATI to the ANC. The ANC, which has received the UATI Allocate Response message, transmits the UATI Allocate message to the AT in step 310 to allocate a new UATI to the AT. Upon receiving the UATI Allocate message, the AT transmits to the ANC the UATI Complete message indicating that the new UATI has successfully been allocated in step 312. The ANC, which has received the UATI Complete message, transmits the UATI Complete Request shown in Table 3 to the DLR1 in step 314. Upon receiving the UATI Complete Request message, the DLR1 transmits the UATI Complete Response message illustrated in Table 4 to the ANC in step 316 to terminate the UATI allocating procedure. In this case, since the DLR1 has the MN ID, it transmits the MN ID for the AT to the ANC through the UATI Complete Response message.

Figure 4:
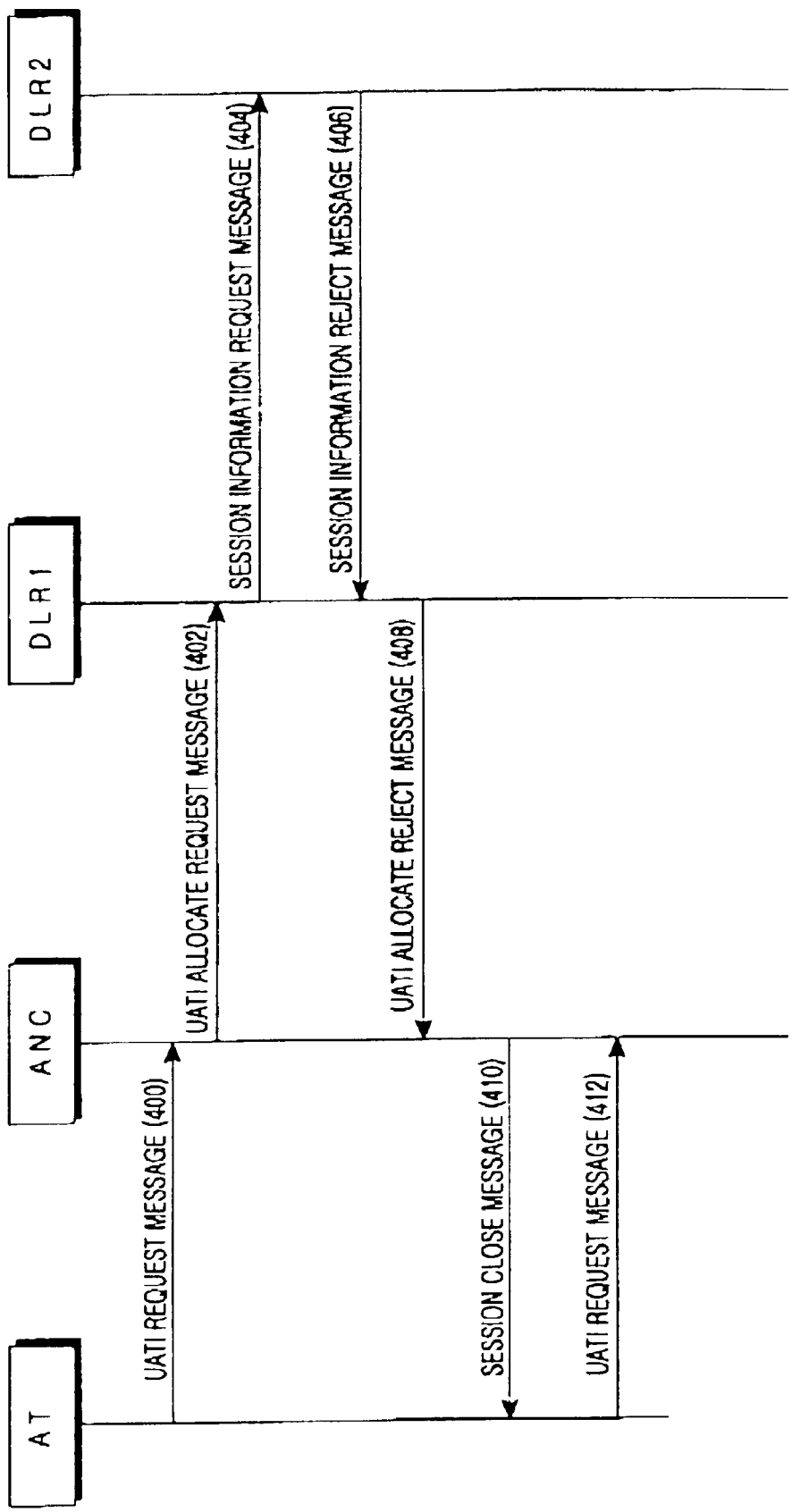
FIG. 4 illustrates a procedure for exchanging messages when the DLR has no session information while the AT hands off in a mobile communication system for high-speed packet data transmission according to a preferred embodiment of the present invention.

FIG. 4 illustrates a procedure for exchanging messages between the AT, ANC, and DLRs while the AT hands off a subnet in the mobile communication system for high-speed packet data transmission. In FIG. 4, a first DLR (DLR2) within a subnet to which the AT has belonged before handoff has no session information, and the AT is to belong to a second DLR (DLR1) through the handoff.

Referring to FIG. 4, the AT transmits the UATI Request message to the ANC in step 400 by use of the OldUATI, which has been allocated from the DLR2 within the subnet before the handoff. Upon receipt of the UATI Request message, the ANC transmits to the DLR1 the UATI Allocate Request message illustrated in Table 1, including the OldUATI instead of the Paging Parameter in step 402. Upon receiving the UATI Allocate Request message, the DLR1 transmits the Session Information Request message to the DLR2 in step 404 to request the DLR2 to transmit the OldUATI-related information. If the OldUATI-related information does not exist or the OldUATI fails in authentication, the DLR2 transmits a Session Information Reject message to the DLR1 in step 406. Upon receipt of the Session Information Reject message, the DLR1 does not allocate the UATI and transmits a UATI Allocate Reject message to the ANC in step 408 to inform the ANC that the OldUATI-related information does not exist. The ANC, which has received the UATI Allocate Reject message, transmits a Session Close message to the AT in step 410. Upon receipt of the Session Close message, the AT closes the session and transmits the UATI Request message to the ANC in step 412 by use of the RATI, rather than the OldUATI after a lapse of a prescribed time to request the ANC to allocate the UATI again. The next processes are the same as when the session is opened for the first time.

Figure 5:
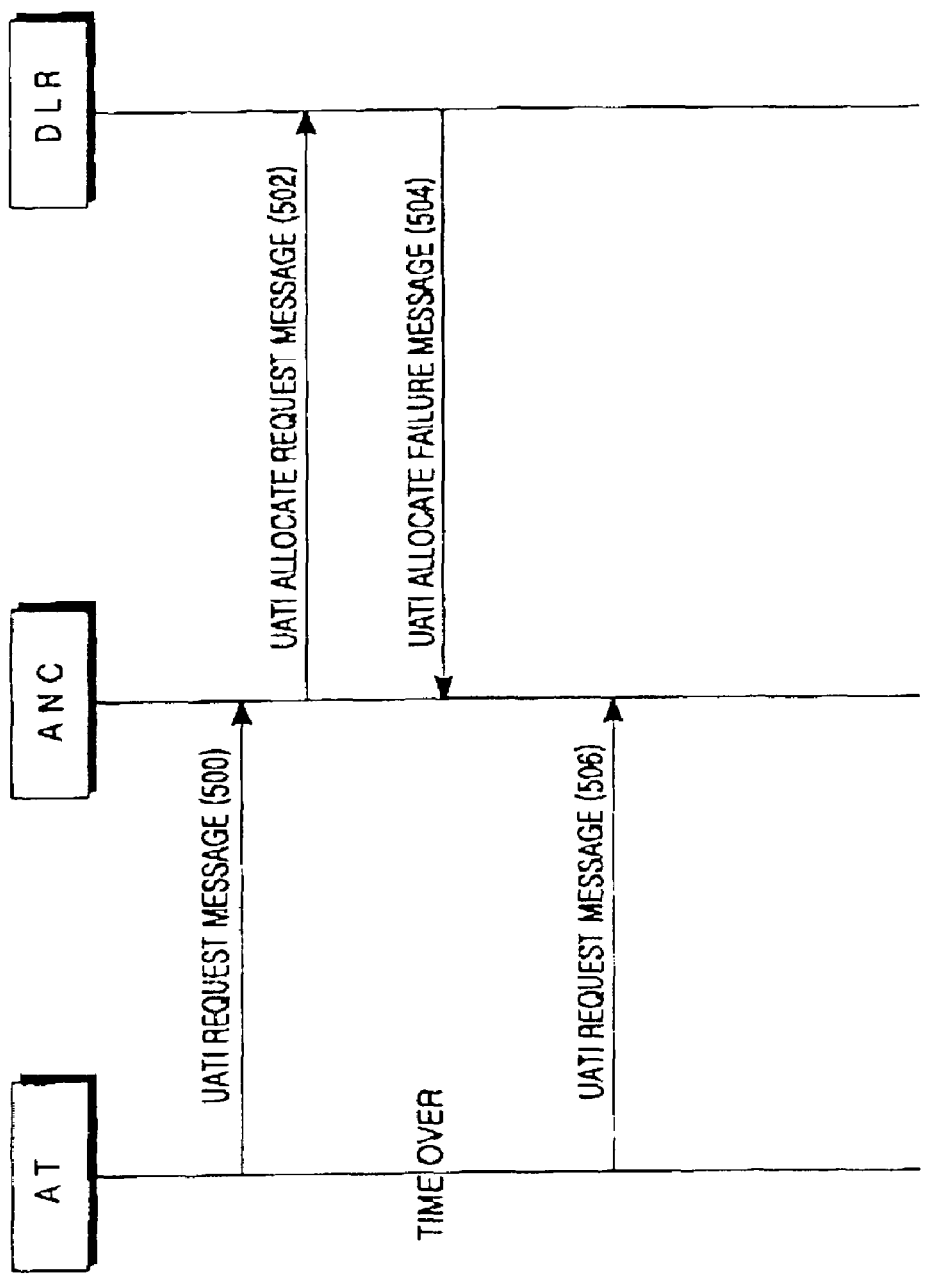
FIG. 5 illustrates a procedure for exchanging messages when there is no UATI to be allocated in a mobile communication system for high-speed packet data transmission according to a preferred embodiment of the present invention.

FIG. 5 illustrates a procedure for exchanging messages between the AT, ANC, and DLR when the allocation of the UATI fails due to the shortage of the unallocated UATI in the mobile communication system for high-speed packet data transmission.

Referring to FIG. 5, the AT transmits the UATI Request message in step 500. The ANC, which has received the UATI Request message, transmits the UATI Allocate Request message shown in Table 1 to the DLR in step 502 to request the DLR to allocate the UATI. If there is no UATI to be allocated, the DLR, which has received the UATI Allocate Request message, transmits a UATI Allocate Failure message to the ANC in step 504 to inform the ANC of failure in allocation. Upon receipt of the UATI Allocate Failure message, the ANC terminates the UATI allocating procedure without transmitting a response message to the AT. Because the UATI has not been allocated, the AT retransmits, in step 506, the UATI Request message to the ANC after a prescribed time period from transmission of the UATI Request message, to request the ANC to allocate the UATI. Preferably, the AT attempts to transmit the UATI Request message up to a maximum of 10 times. The number of attempts for requesting the ANC to allocate the UATI may be arbitrarily set.

Figure 6:
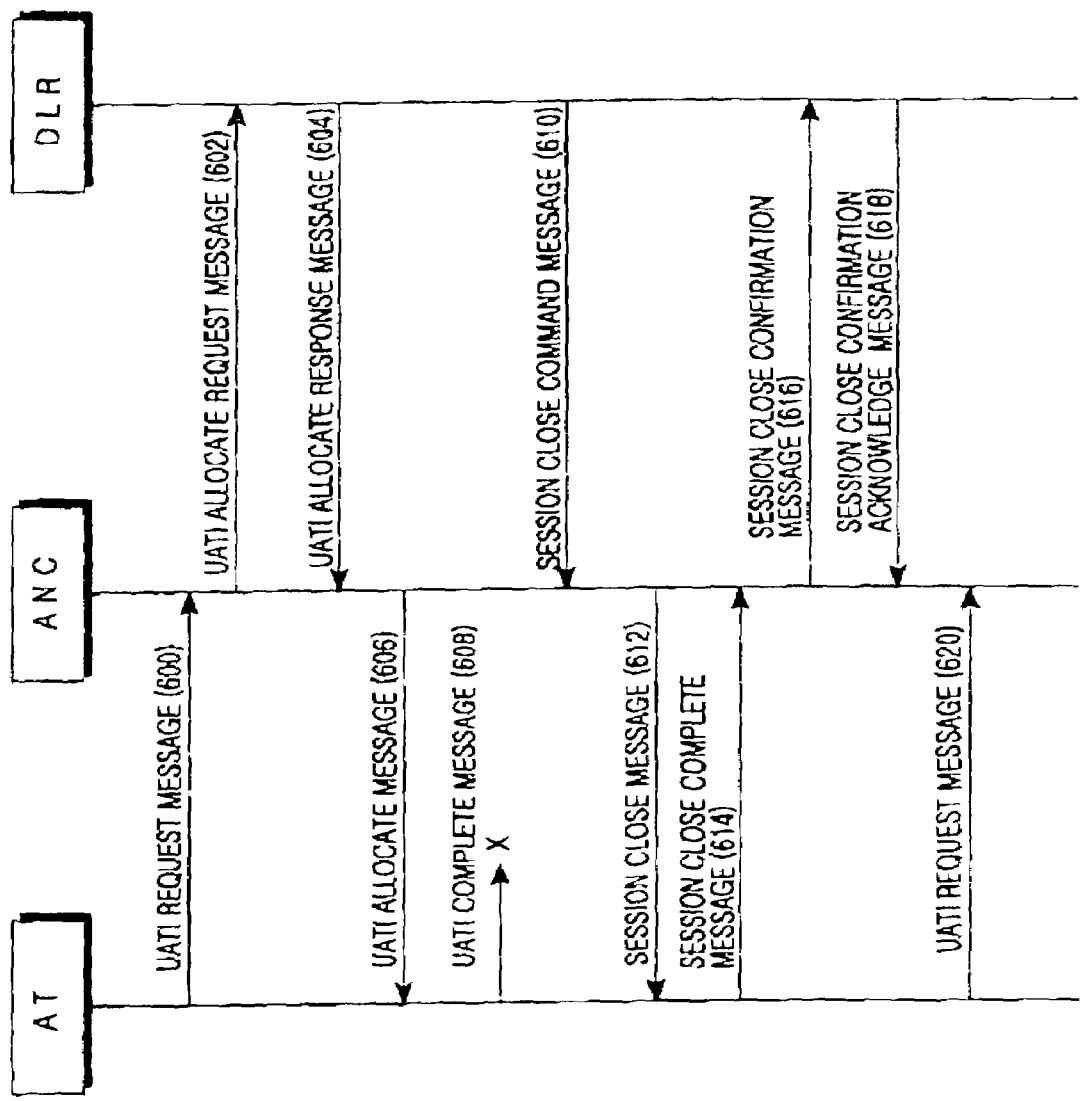
FIG. 6 illustrates a procedure for exchanging messages when a UATI Complete message transmitted by the AT is loss in a mobile communication system for high-speed packet data transmission according to a preferred embodiment of the present invention.

FIG. 6 illustrates a procedure for exchanging messages between the AT, ANC, and DLR when the UATI Complete message transmitted by the AT is damaged in the mobile communication system for high-speed packet data transmission.

Referring to FIG. 6, the AT transmits the UATI Request message to the ANC in step 600. Upon receipt of the UATI Request message, the ANC transmits the UATI Allocate Request message indicated in Table 1 to the DLR in step 602 to request the DLR to allocate the UATI. Upon receipt of the UATI Allocate Request message, the DLR transmits the UATI Allocate Response message shown in Table 2 to the ANC in step 604. The ANC, which has received the UATI Allocate Response message, transmits the UATI Allocate message to the AT in step 606. While the AT, which has received the UATI Allocate message, transmits the UATI Complete message to the ANC in step 608, the UATI Complete message may be damaged due to various reasons. If the UATI Complete Request message is not received for a prescribed time, the DLR transmits to the ANC a Session Close Command message for commanding the ANC to close the allocated UATI-related session and to allocate a new UATI again in step 610. Upon receiving the Session Close Command message, the ANC transmits a Session Close message to the AT in step 612 to request the AT to close the session. The AT, which has received the Session Close message, transmits a Session Close Complete message to the ANC in step 614. Upon receipt of the Session Close Complete message, the ANC transmits a Session Close Confirmation message to the DLR in step 616. The DLR, which has received the Session Close Confirmation message, transmits a Session Close Confirmation Acknowledge message to the ANC in step 618. After a prescribed time from transmission of the Session Close Complete message, the AT retransmits the UATI Request message to the ANC in step 620 to request the ANC to allocate the UATI again.

As described in the message exchanging procedures illustrated in FIGS. 2 to 6, upon receipt of the UATI Allocate Request message from the ANC, the DLR implements a function of allocating the UATI and managing the session information. In allocating the UATI, the DLR processes a UATI allocation request of the ANC with respect to the GAN area. The UATI can be allocated and managed irrespective of the defined subnet area. That is, the DLR can simultaneously support several subnets. Moreover, the different ATs should not have the same UATI. To avoid the duplicated UATI, the UATI that has been allocated to the AT should be allocated to another AT after a lapse of a sufficient time. The DLR also supervises the UATI allocating processes. Namely, the DLR determines whether the UATI Complete Request message for the UATI Complete message transmitted by the AT is received from the ANC. If it is not received, the DLR determines that the UATI has been not allocated. Upon receipt of the OldUATI during the UATI allocating processes, the DLR should obtain the OldUATI-related session information from another DLR. Next, in managing the session information, the DLR stores the MN ID for the AT and the session information etc. with respect to the GAN area, and can support several subnets at the same time. If the ANC requests the DLR to send information, the DLR transmits both the MN ID and the session information.

As described above, messages required to allocate the UATI in the CDMA2000 1×EV-DO system are newly proposed and they are appropriately exchanged between the DLR, the ANC, and the AT, which are a UATI managing system according to circumstances. Therefore, the UATI can be efficiently allocated to the AT. Meanwhile, an AT of the present invention can be referred to a MS (mobile station), and an ANC can be referred to a BS (base station)

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for allocating a Unicast Access Terminal Identifier (UATI) to a given Access Terminal (AT) in a mobile communication system including a Base Station (BS) and a Data Location Register (DLR) connected to the BS, for managing a plurality of UATIs for the ATs, the method comprising the steps of:
upon receipt of a UATI Request message from the AT by the BS, said UATI Request message including an RATI (Random Access Terminal Identifier) generated at random therefrom, transmitting a UATI Allocate Request message including a Paging Parameter to the DLR;
upon receipt of the UATI Allocate Request message by the DLR, recognizing the RATI, allocating one of the remaining UATIs to the AT for opening a new session and transmitting a UATI Allocate Response message including the allocated UATI to the BS; and
upon receipt of the UATI Allocate Response message by the BS, transmitting a UATI Allocate message including the allocated UATI to the AT.

2. The method of claim 1, wherein the UATI Allocate Request message include a Message Type field indicating the type of a message, a Message Length field indicating the length of a message, a TID (Transaction IDentifier) field for identifying ATs, and a Location Registration field used for registering the location of an AT.

3. The method of claim 2, wherein the UATI Allocate Request message further include an OldUATI field for transmitting, if the AT has a previously allocated UATI (OldUATI), an Authentication Parameter field for authenticating the AT, a Paging Parameter field used during paging, and an HW ID (Hardware Identification) field indicating hardware information.

4. The method of claim 1, wherein the UATI Allocate Response message include a Message Type field indicating the type of a message, a Message Length field indicating the length of a message, a TID field for identifying ATs, and an RET (Return) field indicating the result of a service.

5. The method of claim 4, wherein the UATI Allocate Response message further include a UATI field for transmitting, if the AT has an allocated UATI, a PDSN IP Address field indicating an IP address of the PDSN, and an Access Network Address field indicating an address of the AN.

6. The method of claim 1, further comprising the steps of:
upon receipt of a UATI Allocation Complete message by the BS from the AT, which has received the UATI Allocate message, transmitting a UATI Allocate Complete Request message to the DLR; and
upon receipt of the UATI Allocate Complete Request message by the DLR, transmitting a UATI Allocate Complete Response message to the BS, thereby terminating a UATI allocating procedure.

7. The method of claim 6, wherein the UATI Allocate Complete Request message include a Message Type field indicating the type of a message, a Message Length field indicating the length of a message, a TID (Transaction IDentifier) field, for identifying ATs, a Location Registration field used for registering the location of an AT and a UATI field.

8. The method of claim 6, wherein the UATI Allocate Complete Response message include a Message Type field indicating the type of a message, a Message Length field indicating the length of a message, a TID field for identifying ATs, and an RET (Return) field indicating the result of a service.

9. The method of claim 8, wherein the UATI Allocate Complete Response message further include MN(Mobile Node) ID, an OldUATI field for transmitting, if the AT has a previously allocated UATI (OldUATI), a Paging Parameter field used during paging, and an HW ID (Hardware Identification) field indicating hardware information.

10. The method of claim 1, wherein if the DLR, which has received the UATI Allocate Request message, has no remaining UATIs, the DLR transmits a UATI Allocate Failure message to the BS, and after a prescribed time from transmission of the UATI Request message, the AT retransmits the UATI Request message to the BS.

11. The method of claim 6, wherein if the UATI Allocate Complete message transmitted from the AT is loss and thus the DLR does not receive the UATI Allocate Complete Request message from the BS within a prescribed time from transmission of the UATI Allocate Response message, the DLR transmits a Session Close Command message to command the BS to close a session relating to the allocated UATI to the BS, and the BS, which has received the Session Close Command message, transmits a Session Close message to the AT.

12. The method of claim 11, wherein upon receipt of the Session Close message, the AT closes the session and transmits a Session Close Complete message to the BS, the BS, which has received the Session Close Complete message, transmits a Session Close Confirmation message to the DLR, and the DLR, which has received the Session Close Confirmation message, transmits a Session Close Confirmation Acknowledge message to the BS.

13. The method of claim 11, wherein the AT retransmits the UATI Request message to the BS after a prescribed time from transmission of the Session Close Complete message.

* * * * *